United States Patent
Zhu et al.

(10) Patent No.: US 8,798,347 B2
(45) Date of Patent: Aug. 5, 2014

(54) SYSTEM AND METHOD FOR IMAGE-BASED RESPIRATORY MOTION COMPENSATION FOR FLUOROSCOPIC CORONARY ROADMAPPING

(75) Inventors: Ying Zhu, Monmouth Junction, NJ (US); Yanghai Tsin, San Diego, CA (US); Hari Sundar, Piscataway, NJ (US); Frank Sauer, Princeton, NJ (US)

(73) Assignee: Siemens Aktiengesellschaft, Munich (DE)

( * ) Notice: Subject to any disclaimer, the term of this patent is extended or adjusted under 35 U.S.C. 154(b) by 793 days.

(21) Appl. No.: 13/045,624

(22) Filed: Mar. 11, 2011

(65) Prior Publication Data
US 2011/0274334 A1 Nov. 10, 2011

Related U.S. Application Data

(60) Provisional application No. 61/313,862, filed on Mar. 15, 2010, provisional application No. 61/408,156, filed on Oct. 29, 2010.

(51) Int. Cl.
G06K 9/00 (2006.01)
G06T 7/20 (2006.01)

(52) U.S. Cl.
CPC ....... G06T 7/204 (2013.01); G06T 2207/30048 (2013.01); G06T 2207/10121 (2013.01)
USPC ............ 382/130; 382/107; 382/128; 382/132

(58) Field of Classification Search
None
See application file for complete search history.

(56) References Cited

U.S. PATENT DOCUMENTS

| | | | |
|---|---|---|---|
| 7,620,146 B2 * | 11/2009 | Mostafavi ...................... 378/62 |
| 2008/0039713 A1 * | 2/2008 | Thomson et al. ............. 600/411 |
| 2008/0051648 A1 * | 2/2008 | Suri et al. ...................... 600/407 |
| 2012/0082350 A1 * | 4/2012 | Wollenweber ................ 382/128 |
| 2012/0281897 A1 * | 11/2012 | Razifar et al. ................. 382/131 |
| 2012/0289843 A1 * | 11/2012 | Chopra et al. ................. 600/508 |
| 2012/0305780 A1 * | 12/2012 | Thiruvenkadam et al. ........................ 250/363.03 |
| 2013/0223702 A1 * | 8/2013 | Holsing et al. ................ 382/128 |

OTHER PUBLICATIONS

Yizong Cheng, "Mean Shift, Mode Seeking, and Clustering," IEEE Transactions on Pattern Analysis and Machine Intelligence, vol. 17, No. 8, Aug. 1995, pp. 790-799.

Yixin Chen, et al., "Estimation of Symmetric Positive-Definite Matrices From Imperfect Measurements," IEEE Transactions on Automatic Control, vol. 47, No. 10, Oct. 2002, pp. 1721-1725.

(Continued)

*Primary Examiner* — Matthew Bella
*Assistant Examiner* — Julian Brooks

(57) ABSTRACT

A method for compensating respiratory motion in coronary fluoroscopic images includes finding a set of transformation parameters of a parametric motion model that maximize an objective function that is a weighted normalized cross correlation function of a reference image acquired at a first time that is warped by the parametric motion model and a first incoming image acquired at a second time subsequent to the first time. The weights are calculated as a ratio of a covariance of the gradients of the reference image and the gradients of the first incoming image with respect to a root of a product of a variance of the gradients of the reference image and the variance of the gradients of the first incoming image. The parametric motion model transforms the reference image to match the first incoming image.

23 Claims, 10 Drawing Sheets

(56) References Cited

OTHER PUBLICATIONS

Kevin Nickels, et al., "Estimating Uncertainty in SSD-Based Feature Tracking," Article published in Image and Vision Computing, vol. 20, pp. 47-68, 2002.

Ying Zhu, et al. "Coronary DSA: Enhancing Coronary Tree Visibility Through Discriminative Learning and Robust Motion Estimation," Proceeding of SPIE Medical Imaging, vol. 7258, pp. 72591L-72591L-8, 2009.

Nabil Ali Ahmed, et al., "Entropy Expressions and Their Estimators for Multivariate Distributors," IEEE Transactions on Information Theory, vol. 35, No. 3, May 1989, pp. 688-692.

Jason Cantarella, et al., "TSNNLS: A Solver for Large Sparse Least Squares Problems With Non-Negative Variables," pp. 1-7.

* cited by examiner

Function with single dominant mode ($\Upsilon = 6.85$).

| # | Accepted Frames | Uncorrected (All) | (Acc.) | Translational (All) | (Acc.) | R+S (Acc.) |
|---|---|---|---|---|---|---|
| 1 | 0/5 (0%) | 3.407 | N/A | 1.567 | N/A | N/A |
| 2 | 9/10 (90 %) | 0.572 | 0.503 | 1.299 | 1.365 | 0.564 |
| 3 | 5/6 (83 %) | 0.869 | 0.695 | 0.800 | 0.612 | 0.554 |
| 4 | 4/4 (100 %) | 0.818 | 0.818 | 1.212 | 1.212 | 1.026 |
| 5 | 0/7 (0 %) | 2.386 | N/A | 2.177 | N/A | N/A |
| 6 | 2/8 (25 %) | 1.406 | 0.470 | 1.547 | 1.130 | 0.630 |
| 7 | 5/5 (100 %) | 1.984 | 1.984 | 1.254 | 1.254 | 1.340 |
| 8 | 5/5 (100 %) | 1.420 | 1.420 | 1.133 | 1.133 | 0.913 |
| 9 | 9/9 (100 %) | 1.935 | 1.935 | 1.455 | 1.455 | 1.226 |
| 10 | 5/10 (50 %) | 2.128 | 1.368 | 0.959 | 0.693 | 0.874 |
| 11 | 3/9 (33 %) | 4.905 | 3.121 | 3.702 | 0.763 | 0.811 |
| 12 | 1/6 (17 %) | 3.360 | 1.882 | 1.965 | 2.050 | 1.580 |
| 13 | 1/7 (14 %) | 1.261 | 1.196 | 3.345 | 2.408 | 2.788 |
| 14 | 2/7 (28 %) | 6.592 | 1.164 | 3.579 | 1.012 | 0.883 |
| 15 | 7/7 (100 %) | 2.328 | 2.328 | 0.990 | 0.990 | 1.023 |
| 16 | 3/4 (75 %) | 4.791 | 3.618 | 0.635 | 0.570 | 0.744 |
| Tot. | 61/109 (59 %) | 2.474 | 1.564 | 1.796 | 1.121 | 0.948 |

(1) Mean Error Distances in mm.

FIG. 9

SYSTEM AND METHOD FOR IMAGE-BASED RESPIRATORY MOTION COMPENSATION FOR FLUOROSCOPIC CORONARY ROADMAPPING

CROSS REFERENCE TO RELATED UNITED STATES APPLICATIONS

This application claims priority from "Image-based Soft Tissue Motion Analysis and Motion Compensation in Fluoroscopic Images", U.S. Provisional Application No. 61/313,862 of Zhu, et al., filed Mar. 15, 2010, and "Self-Assessing Image-Based Respiratory Motion Compensation For Fluoroscopic Coronary Roadmapping", U.S. Provisional Application No. 61/408,156 of Manhart, et al., filed Oct. 29, 2010, the contents of both of which are herein incorporated by reference in their entireties.

TECHNICAL FIELD

This disclosure is directed to methods for motion compensation of respiratory motion in live X-ray fluoroscopic images.

DISCUSSION OF THE RELATED ART

Motion compensation is an important issue for image guided coronary angioplasty procedures. As the primary imaging modality for cardiac intervention, live X-ray fluoroscopy is widely used in percutaneous coronary intervention (PCI) procedures, for instance, for directing guidewires, placing stents and crossing chronic total occlusions (CTO). Dynamic coronary roadmapping and multimodality image fusion are important techniques developed to provide advanced imaging guidance, where 2D or 3D vessel roadmaps acquired from fluoroscopic, computed tomography (CT) or magnetic resonance (MR) angiography are superimposed on live fluoroscopy for real-time guidance. In coronary roadmapping, a dynamic coronary roadmap image reflecting cardiac motion is obtained from a dye injected image. Once the contrast medium disappears, the 2D roadmap is superimposed on the live fluoroscopic images to provide immediate feedback in directing a guidewire into the appropriate coronary artery branch or placing a stent at the site of stenosis. In multimodal image fusion, a 3D vessel roadmap extracted from cardiac computed tomography angiography (CTA) or magnetic resonance angiography (MRA) is overlaid on live fluoroscopic images through 2D-3D registration to provide more detailed vessel information such as calcification and tortuosity which are important factors for the success of percutaneous coronary intervention procedures. In both cases, reliable motion compensation is required to dynamically move a 2D or 3D coronary roadmap to properly match the live fluoroscopic images, especially when the contrast medium has disappeared and the coronary arteries are no longer visible.

The main sources of motion observed in coronary fluoroscopic images include cardiac motion and respiratory motion. To deal with cardiac motion, ECG gating is commonly used to synchronize live images with corresponding roadmaps at approximately the same cardiac phases. In contrast, respiratory motion is less reproducible and drawbacks are associated with respiratory gating. The effect of respiration on the heart and coronary arteries as well as representative motion models have been investigated in earlier studies involving volumetric and biplane data. It remains a challenging issue to compensate breathing motion in live fluoroscopy, which consists of transparent layers of static bone tissues and moving soft tissues as well as contrast-filled vessels and devices.

In cardiac fluoroscopic images, transparent layers of both static bone tissues and soft tissue structures undergoing cardiac and respirator motion are present, making image motion compensation a challenging task. The technique of guidewire tracking can help to locate a coronary artery in fluoroscopic images given that the guidewire is fully inserted into the artery. The performance of such an approach is limited when processing images with poor guidewire visibility or with multiple wires in the vicinity. An interesting observation about live coronary fluoroscopy images is that regardless of the presence of the contrast medium, guidewires or other devices, the motion of the soft tissues of the heart area is strongly and consistently visible and measurable, which suggests the motion of the coronary arteries, especially when the contrast medium is not shown.

SUMMARY OF THE INVENTION

Exemplary embodiments of the invention as described herein generally include methods and systems for image-based respiratory motion compensation for coronary roadmapping in fluoroscopic images. Static structures can be identified in fluoroscopic images over a cardiac cycle, which allows image information of soft tissues to be separated and used for respiratory motion estimation. An extended Lucas-Kanade algorithm involving a weighted sum-of-squared-difference (WSSD) measure can estimate soft tissue motion reliably when a layer of static structures is present. A temporally compositional motion model can handle large image motion incurred by deep breathing. The recovered image motion allows dynamically moving the coronary roadmap to match the live fluoroscopic images when contrast medium has disappeared.

To handle situations involving multiple local optima, a kernel-based nonparametric data analysis can characterize the objective function involved in motion estimation. A mode analysis can capture the dominant component of the respiratory image motion and increase the chance of finding the global optimum. In addition, an information theoretic measure can assess the uncertainty of the motion estimation and automatically detect unreliable motion estimates. Methods according to embodiments of the invention are evaluated on real clinical data from different procedures of percutaneous coronary interventions.

According to an aspect of the invention, there is provided a method for compensating respiratory motion in coronary fluoroscopic images, including finding a set of transformation parameters of a parametric motion model that minimize a weighted sum of square distances between a reference image acquired at a first time that is warped by the parametric motion model and a first incoming image acquired at a second time subsequent to the first time, where the weights are calculated as a ratio of a covariance of gradients of the reference image and gradients of the first incoming image with respect to a root of a product of a variance of the gradients of the reference image and the variance of the gradients of the first incoming image, and where the parametric motion model transforms the reference image to match the first incoming image.

According to a further aspect of the invention, minimizing the weighted sum of square distances includes initializing a parametric motion model of soft tissue in a reference image acquired at a first time and in an incoming image acquired at a second time, using the parametric motion model to warp the reference image and a local correlation coefficient of the gradient fields between the reference and the incoming images, computing a residual image that is a difference between the incoming image and the warped reference image, using the parametric motion model to warp the gradient of the reference image, computing a Jacobian matrix of the parametric motion model and a Hessian matrix using the Jacobian matrix, the warped reference image gradients, and the warped and unwarped local correlation coefficients, and calculating an update to the parameters of the parametric motion model from the Hessian matrix, the Jacobian matrix, the warped reference image gradients, the warped and unwarped local correlation coefficients, and the residual image.

According to a further aspect of the invention, the reference image comprises a fluoroscopic image acquired when a contrast agent is injected, and the first incoming image is a fluoroscopic image acquired after the contrast medium has disappeared.

According to a further aspect of the invention, the method includes calculating the parametric motion model between the reference image and a second incoming image acquired at a third time subsequent to the second time by compositional motion model $W(x,P_{2,0})=W(W(x,P_{2,1}),P_{1,0})$, where $W(x,P)$ represents the parametric motion model as a function of image points x and parameters P, $W(x,P_{2,1})$ represents the parametric motion model between the first incoming image and the second incoming image, $W(x, P_{1,0})$ represents the parametric motion model between the reference image and the first incoming image, and $W(x,P_{2,0})$ represents the parametric motion model between the reference image and the second incoming image.

According to a further aspect of the invention, the weighted sum of square distances is represented as $$P = \mathrm{argmin} \frac{1}{K} \sum_{x \in \Omega_P^{-1}} \kappa(x)\kappa(W(x,P)) \|I_t(x) - I_R(W(x,P))\|^2,$$

$$\kappa(x) = \frac{1}{2}(1 - \rho(x)); K = \sum_{x \in \Omega_P^{-1}} \kappa(x)\kappa(W(x,P)),$$

where $I_t(x)$ represents the first incoming image, $I_R(x)$ represents the reference image, $W(x,P)$ represents the parametric motion model as a function of image points x and parameters P, $\Omega_P^{-1}=W^{-1}(\Omega,P)$, $\Omega$ denotes the image region of the heart exclusive of the coronary arteries due to contrast disappearance, $$\rho(x) = \frac{\mathrm{cov}(|\nabla I_t(x')|, |\nabla I_R(x')|)}{\sqrt{\mathrm{var}(|\nabla I_t(x')|)\mathrm{var}(|\nabla I_R(x')|)}} |x' \in N(x),$$

and where $\mathrm{Cov}(|\nabla I_t|,|\nabla I_R|)$ and $\mathrm{var}(|\nabla I_{t/R}|)$ are the covariance and variance terms of the gradients of $I_t$ and $I_R$ computed in a local neighborhood $N(x)$.

According to a further aspect of the invention, the Hessian matrix $\tilde{H}$ is computed from $$\tilde{H} = \sum_{x \in \Omega_P^{-1}} \kappa(x)\kappa(W(x,P)) \left(\frac{\partial W}{\partial P} \nabla I_R\right)\left(\frac{\partial W}{\partial P} \nabla I_R\right)^T,$$

where $$\frac{\partial W}{\partial P}$$

is the Jacobian matrix of the parametric motion model W with respect to the parameters P.

According to a further aspect of the invention, the update $\Delta P$ to the parameters of the parametric motion model are calculated from $$\Delta P = \tilde{H}^{-1} \sum_{x \in \Omega_P^{-1}} \nabla I_R^T \left(\frac{\partial W}{\partial P}\right)^T \kappa(x)\kappa(W(x,P))(I_t(x) - I_R(W(x,P))),$$

and the parameters are updated as $P \leftarrow P + \Delta P$.

According to another aspect of the invention, there is provided a method for compensating respiratory motion in coronary fluoroscopic images, including finding a set of transformation parameters of a parametric motion model that maximize an objective function that is a weighted normalized cross correlation function of a reference image acquired at a first time that is warped by the parametric motion model and a first incoming image acquired at a second time subsequent to the first time, where the weights are calculated as a ratio of a covariance of gradients of the reference image and gradients of the first incoming image with respect to a root of a product of a variance of the gradients of the reference image and the variance of the gradients of the first incoming image, and where the parametric motion model transforms the reference image to match the first incoming image.

According to a further aspect of the invention, finding a set of transformation parameters that maximize the objective function includes performing a sparse sampling in a space of the transformation parameters of the parametric motion model, calculating an approximation to the objective function from a weighted sum over kernel density functions centered at the sparse samples, where the weights are non-negative values calculated by minimizing a sum of square differences of objective function values of the sparse samples and the approximate objective function values of the sparse samples, finding the local maxima of the approximate objective function, performing a dense sampling in a local neighborhood about each local maximum, normalizing objective function values of the dense samples, calculating an improved approximate objective function for each local maximum from the normalized function values of the dense samples, finding an improved local maximum of the improved approximate objective function for each local maximum, and selecting an improved local maximum with a highest function value as a global optimum.

According to a further aspect of the invention, the kernel density function is a Gaussian function $$K(P, p_i, \sigma_s^2) = \frac{\exp(-\|P - p_i\|^2/(2\sigma_s^2))}{(2\pi\sigma_s^2)^{dim(P)/2}}$$

where P a parameter of the parametric motion model, $p_i$ is a sampled parameter value, and $\sigma_s^2$ is a standard deviation.

According to a further aspect of the invention, a mean shift method if used to calculate the local maxima of the approximate objective function, and the improved local maximum of the improved approximate objective function.

According to a further aspect of the invention, normalizing objective function values of the dense samples comprises calculating $\bar{f}(p_{i,j}) = \max\{0, f_{wncc}(p_{i,j}) - f_{m,i} + 0.1\}$, where $p_{i,j}$ is a jth dense sample in the local neighborhood of an ith local maximum, $f_{wncc}$ is the objective function, $f_{m,i} = \max\{f_{wncc}(p_{i,j}): j=1, \ldots, n_i\}$, and $n_i$ is the number of samples.

According to a further aspect of the invention, calculating an improved approximate objective function $\hat{f}_i(P)$ for each local maximum i comprises calculating $$\hat{f}_i(P) = \sum_j \hat{w}_j K(P, p_{i,j}, \sigma_d^2),$$

where the sum is over all samples about the local maximum, and the weights $\hat{w}_j$ are calculated using normalized function values at the dense samples.

According to a further aspect of the invention, the method includes calculating an uncertainty $\in_i$ of the objective function about each local maximum i from $\in_i = \ln(|\hat{C}_i|)$, where $\hat{C}_i$ is a covariance calculated as $$\hat{C}_i = \operatorname{argmin}_{(C \in S)} \sum_j \left\| \nabla K(P, p_{i,j}, C) - \nabla \hat{f}_i(p_{i,j}) \right\|^2,$$

where S denotes the set of positive definite matrices, $\nabla \hat{f}_i$ is a gradient of the improved approximate objective function, and K is a Gaussian defined as $$K(P, p_{i,j}, \hat{C}_i) = \frac{\exp\left(-\frac{1}{2}(P - p_{i,j})^T C_i^{-1}(P - p_{i,j})\right)}{(2\pi)^{dim(P)/2} |C_i|^{1/2}}.$$

According to a further aspect of the invention, the method includes calculating an uncertainty of the objective function as $$Y = \sum_{i=1}^{M} w_i \varepsilon_i,$$

where $w_i = \max\{0, 1 - (f_{wncc}(m_i) - f_m)/s_{th}\}$, $f_m = \max\{f_{wncc}(\hat{m}_i): i=1, \ldots, M\}$, $\hat{m}_i$ is an ith local maximum, and $s_{th}$ is a threshold, and where a motion estimate is accepted when its uncertainty measure Y is below a threshold $Y_{th}$, and the objective function value is above a threshold $f_{th}$.

According to another aspect of the invention, there is provided a program storage device readable by a computer, tangibly embodying a program of instructions executable by the computer to perform the method steps for compensating respiratory motion in coronary fluoroscopic images.

BRIEF DESCRIPTION OF THE DRAWINGS

FIG. 9 is a table of mean error distances in millimeters, according to an embodiment of the invention.

DETAILED DESCRIPTION OF EXEMPLARY EMBODIMENTS

Figure 1:
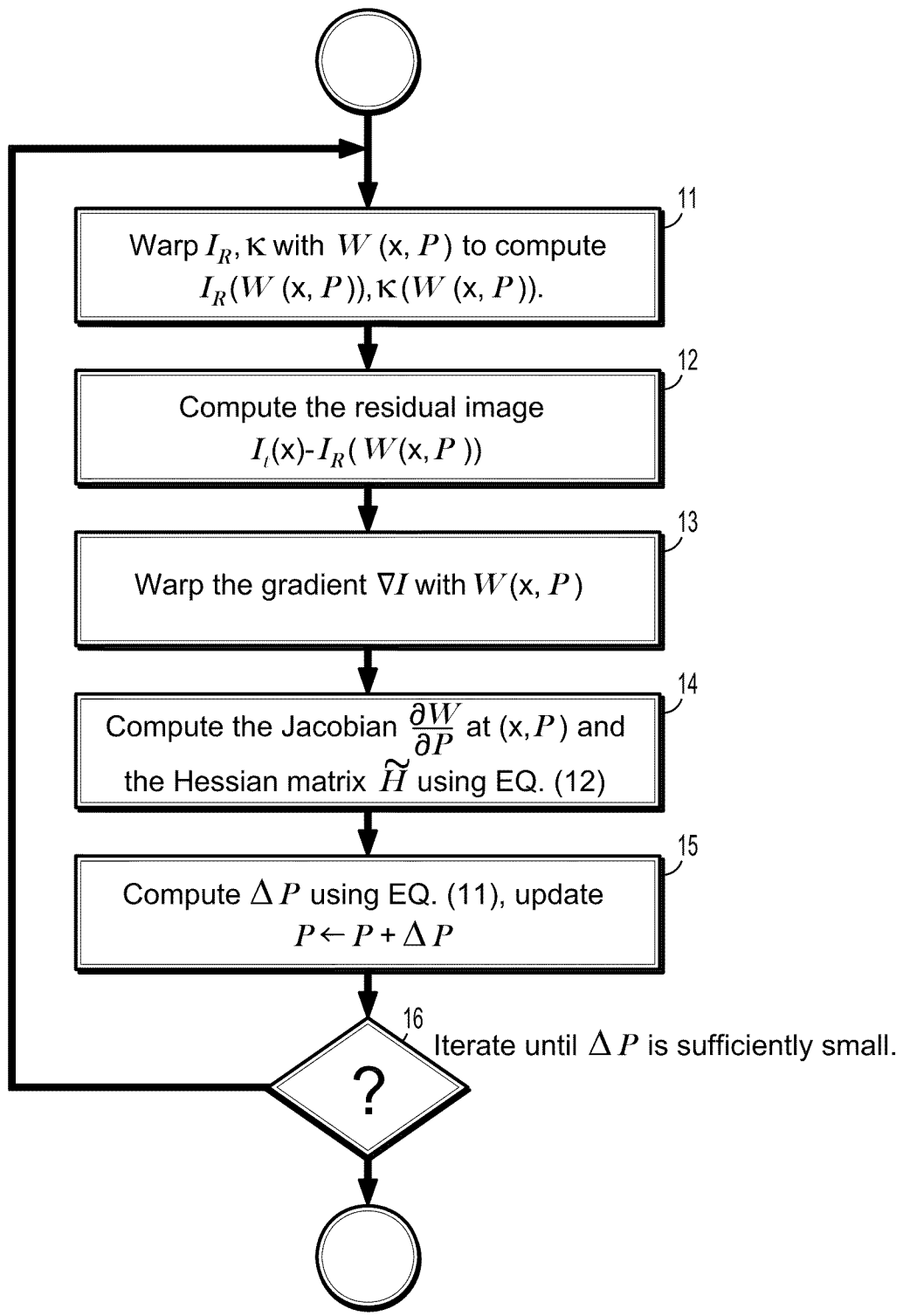
FIG. 1 is a flow chart of an extended KL algorithm according to an embodiment of the invention.
Figures 2A, 2B, 2C, 2D, 2E, 2F:
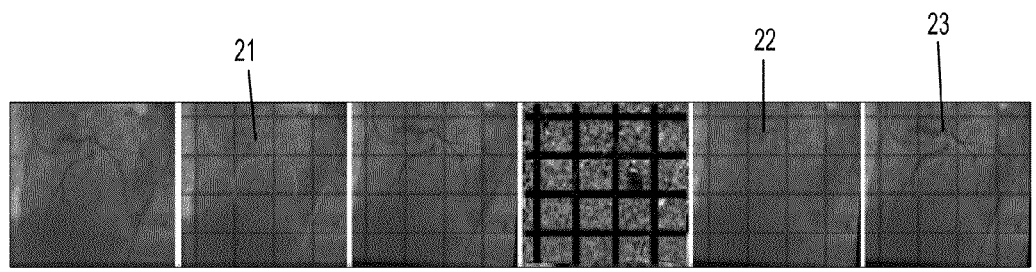
FIGS. 2(a)-(f) illustrates how a WSSD-based method according to an embodiment of the invention works with static structures.

Exemplary embodiments of the invention as described herein generally include systems and methods for motion compensation of respiratory motion in live X-ray fluoroscopic images. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R or $R^7$, the methods of the inventions are not limited to such images, and can be applied to images of any dimension, e.g., a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Methods

In X-ray imaging, image intensity is determined by the energy flux which undergoes exponential attenuation through layers of tissues. After logarithmic post-processing, the intensity can be described as an additive superposition of multiple tissue layers undergoing different movements.

For coronary roadmapping, the goal is to extract the coronary motion incurred by respiration, especially after the contrast medium has disappeared. Different motion models including translation, rigid body and affine transformations have been studied to characterize the effect of respiratory motion on the heart. A simplified model includes two main layers, a layer of static structures including bone tissues and a layer of moving soft tissues in the heart region including the coronary arteries. Denote $I_t(x)$, $I^S(x)$ and $I_t^d(x)$ as the intensity value of pixel x of the fluoroscopic image, the static layer and the dynamically moving layer at time t. The additive superposition model can be expressed as:

$$I_t(x) = I^S(x) + I_t^d(x). \tag{1}$$

In coronary roadmapping, after the contrast medium is injected, the 2D or 3D coronary roadmap is initially overlaid on one or multiple fluoroscopic images through vessel-based registration. These fluoroscopic images are referred to as the reference images. Once the contrast medium disappears, motion compensation is performed by recovering the motion of dynamically moving soft tissues between the reference images and the live fluoroscopic images. The recovered motion information is used to move the coronary roadmap to appropriately match the incoming contrast-less fluoroscopic images. Denote $I_R(x) = I^S(x) + I_R^d(x)$ as a reference image. An incoming fluoroscopic image with approximately the same cardiac phase acquired at time t is related to $I_R$ through soft tissue motion:

$$I_t(x) = I^S(x) + I_R^d(W(x,P)), (x \notin \Omega) \tag{2}$$

where $W(x,P)$ denotes the parametric motion model of the soft tissues between R and t with parameters P, and $\Omega$ denotes the image region of the heart exclusive of the coronary arteries due to contrast disappearance. The task is to estimate the soft tissue motion $W(x,P)$ from $I_R$ and $I_t$.

Image-Based Motion Estimation

Without the layer of static structures $I^S$, there is $I_{t_0} = I_{t_0}^d$, $I_t = I_t^d$ and $I_t(x) = I_{t_0}(W(x,P))$. Motion estimation can be solved by the Lucas-Kanade (LK) algorithm, which uses a Gauss-Newton gradient descent method to minimize a sum of squared difference (SSD):

$$\min SSD(P) = \frac{1}{N_{\Omega,P}} \sum_{x \in \Omega_P^{-1}} \|I_t(x) - I_R(W(x, P))\|^2, \tag{3}$$

where $\Omega_P^{-1} = W^{-1}(\Omega, P)$ and $N_{\Omega,P}$ is the number of pixels in $\Omega_P^{-1}$. Through a first order Taylor expansion, one has:

$$SSD(P + \Delta P) \approx \frac{1}{N_{\Omega,P}} \sum_{x \in \Omega_P^{-1}} \left[ I_R(W(x, P)) + \nabla I_R^T \left(\frac{\partial W}{\partial P}\right)^T \Delta P - I_t(x) \right]^2 \tag{4}$$

and the motion parameters can be updated iteratively by adding small increments to minimize the function of EQ. (3):

$$\Delta P = H^{-1} \sum_{x \in \Omega_P^{-1}} \nabla I_{t_0}^T \left(\frac{\partial W}{\partial P}\right)^T (I_t(x) - I_R(W(x, P))), \tag{5}$$

$$H = \sum_{x \in \Omega_P^{-1}} \left(\frac{\partial W}{\partial P} \nabla I_R\right)\left(\frac{\partial W}{\partial P} \nabla I_R\right)^T,$$

Where $$\nabla I_R = \left[\frac{\partial I_R}{\partial x}, \frac{\partial I_R}{\partial y}\right]^T$$

is the image gradient evaluated at $W(x,P)$, and $$\frac{\partial W}{\partial P}$$

is the Jacobian of the motion transformation. According to an embodiment of the invention, a pyramid implementation of the algorithm may be used, where the motion parameters are first estimated at a reduced resolution and then propagated to and refined at higher resolutions. For coronary roadmapping, an affine motion model can be used to describe the image motion of the soft tissues in the heart area, and the Jacobian can be expressed as $$\frac{\partial W}{\partial P} = \begin{bmatrix} x & 0 & y & 0 & 1 & 0 \\ 0 & x & 0 & y & 0 & 1 \end{bmatrix}.$$

Dealing with Static Structures

With a layer of static structures such as the spine, visible skin markers and devices, the image intensities $\{I_t(x), I_R(x)\}$ have an added component $I^S(x)$ which remains static over time. Without proper treatment, the static structures would have an adverse effect on the estimation of soft tissue motion. Note that the motion parameters obtained by the LK algorithm, above, are essentially determined by two gradient terms: the spatial image gradient $\nabla I_R$, and the temporal image gradient $I_t(x) - I_R(W(x,P))$:

$$\nabla I_R = \nabla I_R^d + \nabla I^S, I_t(x) - I_R(w(x,P)) = I_t^d(x) - I_R^d(W(x,P)) + I^S(x) - I^S(W(x,P)). \tag{6}$$

Ideally the soft tissue motion should be estimated from $\nabla I_R^d$ and $I_t^d(x) - I_R^d(W(x,P))$, which would require knowing $I^S$ exactly. Instead of requiring the full knowledge of $I^S$ to remove $I^S$ and $\nabla I^S$ from $I_R$, $I_t$, and $\nabla I_R$ one can explore the gradient fields $\{\nabla I_t, \nabla I_R\}$ to identify local image structures with high gradient values which are likely to be static. This is motivated by the fact that local image structures with high gradient values are sparsely distributed in $I^S$. For the vast homogeneous areas in $I^S$, $\nabla I^S$ is negligible, thus $\nabla I^S \approx 0$ and $I^S(W(x,P)) \approx I^S(x)$ given that the motion is small, and therefore $$\nabla I_R(x) \approx \nabla I_R^d(x), \tag{7}$$

$$I_t(x) - I_R(W(x,P)) \approx I_t^d(x) - I_R^d(W(x,P)). \tag{8}$$

This means that if one ignores the local image structures that have high gradient values and remain static across $I_t$ and $I_R$, one can obtain an approximate solution for soft tissue motion using $I_t$ and $I_R$.

To identify the local static structures with strong gradients, one computes in the gradient field the local correlation coefficient between images acquired at different times:

$$\rho(x) = \frac{\text{cov}(|\nabla I_t(x')|, |\nabla I_R(x')|)}{\sqrt{\text{var}(|\nabla I_t(x')|)\text{var}(|\nabla I_R(x')|)}} \bigg| x' \in N(x) \quad (-1 \leq \rho(x) \leq 1). \tag{9}$$

$\text{cov}(|I_t|, |\nabla I_R|)$ and $\text{var}(|\nabla I_{t/R}|)$ are the covariance and variance terms computed in a local neighborhood $N(x)$. The correlation coefficient $\rho(x)$ is bounded between $-1$ and $1$. The more consistent the local structures are across images, the higher is the correlation coefficient. $\rho(x)=1$ when the local structures are exactly the same in both images. In practice, when multiple incoming fluoroscopic images or reference images are available, the local correlation coefficient over multiple images is computed as the statistical mean of the local correlation coefficient between every image pair. Using the local correlation coefficient, an extended LK algorithm according to an embodiment of the invention for estimating soft tissue motion by minimizing a weighted SSD (WSSD) may be defined as follows:

$$P = \operatorname{argmin} \frac{1}{K} \sum_{x \in \Omega_P^{-1}} \kappa(x) \kappa(W(x, P)) \|I_t(x) - I_R(W(x, P))\|^2, \quad (10)$$

$$\kappa(x) = \frac{1}{2}(1 - \rho(x))(0 \le \kappa(x) \le 1); K = \sum_{x \in \Omega_P^{-1}} \kappa(x) \kappa(W(x, P)).$$

The motion parameters are iteratively updated by $$\Delta P = \tilde{H}^{-1} \sum_{x \in \Omega_P^{-1}} \nabla I_R^T \left(\frac{\partial W}{\partial P}\right)^T \kappa(x) \kappa(W(x, P))(I_t(x) - I_R(W(x, P))), \quad (11)$$

where $$\tilde{H} = \sum_{x \in \Omega_P^{-1}} \kappa(x) \kappa(W(x, P)) \left(\frac{\partial W}{\partial P} \nabla I_R\right) \left(\frac{\partial W}{\partial P} \nabla I_R\right)^T. \quad (12)$$

The weighting function $\kappa(x)$ determines the contribution from each pixel to the estimation of soft tissue motion. For static structures across multiple images, the local correlation coefficient $\rho(x)$ is close to 1 and $\kappa(x)$ is close to 0, and their contribution in the gradient domain to the WSSD is negligible. Therefore the motion parameters obtained by a WSSD method according to an embodiment of the invention are determined mainly by the gradient structures of the moving tissues.

Give, a reference image and an incoming fluoroscopic image and an initialization of the motion model $W(x,P)$, an extended KL algorithm according to an embodiment of the invention may be summarized as follows, with reference to the flow chart of FIG. 1.
1. (Step 11) Warp $I_R$, $\kappa$ with $W(x,P)$ to compute $I_R(W(x,P))$, $\kappa(W(x,P))$.
2. (Step 12) Compute the residual image $I_t(x) - I_R(W(x,P))$.
3. (Step 13) Warp the gradient $\nabla I$ with $W(x,P)$ to compute $\nabla I((W(x;P))$,
4. (Step 14) Compute the Jacobian $$\frac{\partial W}{\partial P}$$

at $(x,P)$ and the Hessian matrix $\tilde{H}$ using EQ. (12).
5. (Step 15) Compute $\Delta P$ using EQ. (11), update $P \leftarrow P + \Delta P$.
An extended KL procedure according to an embodiment of the invention iterates from step 16 until $\Delta P$ is sufficiently small. The motion model $W(x,P)$ may be initialized to the identity transformation, $W(x,P)=x$. The estimated motion model $W(x,P)$ may then be used to transform the coronary roadmap image to match the incoming image $I_t$.

FIGS. 2(a)-(f) illustrates a WSSD-based motion estimation with static structures, according to an embodiment of the invention. FIG. 2 depicts, from left to right: the original coronary image in FIG. 2(a), the reference image with a vesselness map 21 simulating a coronary roadmap in FIG. 2(b), a test image in FIG. 2(c), the weighting function computed from local correlation coefficients in FIG. 2(d), an overlay of the vesselness map 22 after computing a WSSD-based motion compensation in FIG. 2(e), and an overlay of the vesselness map 23 after computing a standard SSD-based motion compensation in FIG. 2(f). The motion estimation started with a real coronary image as the reference image, and introduced rotation, scaling and translation to generate the test image. A layer of static grid structures was blended into the reference image and the test image. The weighting function computed from the local correlation coefficients captures the static grid structures. A vesselness map was used to simulate the roadmap overlays. Compared to a standard SSD-based method, a WSSD-based method according to an embodiment of the invention provides improved motion compensation when static structures are present, and the roadmap overlay more accurately matches the actual coronary arteries.

Compositional Motion Model

Figure 3:
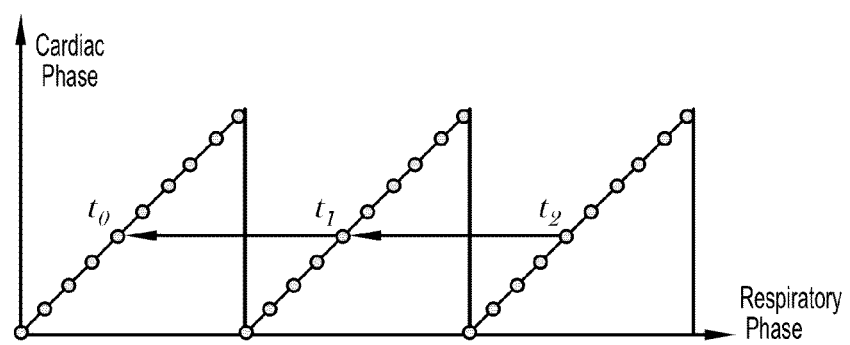
FIG. 3 illustrates the temporally composition motion model according to an embodiment of the invention.

To compensate large image motion incurred by breathing, a temporally compositional motion model may be used. The main idea behind it is illustrated in FIG. 3. Assume that the roadmap image is initially overlaid on a reference image $I_R$, acquired at $t_0$ and for incoming fluoroscopic images, respiratory motion compensation is carried out on cardiac gated frames. At time $t_1$ motion compensation is performed between $I_{t_1}$ and $I_R$, to transform the roadmap image to match $I_{t_1}$. Denote the motion between $I_{t_1}$ and $I_R$ as $W(x,P_{1,0})$. As the respiratory phase moves away from $t_0$ to $t_2$ for example, the soft tissue motion observed in the fluoroscopic image may be quite large, which makes direct motion estimation between $I_{t_2}$ and $I_R$ challenging. Instead, the motion $W(x,P_{2,1})$ between $I_{t_2}$ and $I_{t_1}$ may be estimated by first assuming that the difference between $I_{t_2}$ and $I_{t_1}$ is much smaller than the different between $I_{t_2}$ and $I_R$. A compositional motion model $W(x,P_{2,0})=W(W(x,P_{2,1}),P_{1,0})$ can be used to initialize the motion parameters $P_{2,0}$ and an extended LK algorithm according to an embodiment of the invention may be continued to refine the motion model $W(x,P_{2,0})$ between $I_{t_2}$ and $I_R$. In essence, $I_{t_1}$ serves as an online reference image to relate the live fluoroscopic image $I_{t_2}$ to the predetermined reference image $I_R$. According to an embodiment of the invention, multiple online reference images covering a normal respiratory cycle are used in the motion compensation of live fluoroscopic images.

Formulation for Handling Multiple Local Optima

The task of estimating the soft tissue motion $W(x,P)$ of the heart due to respiratory motion between $I_R$ and $I_t$ with parameters P has been formulated above as an optimization task $$P = \arg\min \kappa_t(x) \kappa_R(W(x,P)) f(I_t(x), I_R(W(x,P))), \quad (13)$$

where $f$ is a sum of square distances, $\kappa_R$ and $\kappa_t: R^2 \to [0,1]$ are weighting functions that exclude areas with contrast wash-in and wash-out between $I_R$ and $I_t$ and suppress static image structures in motion estimation. To be robust to changes of image contrast caused by varying acquisition conditions, according to an embodiment of the invention, a weighted normalized cross correlation (WNCC) may be used as the objective function $f$ to replace the WSSD objective function:

$$P = \operatorname{argmax} f_{wncc}(P), \quad (14)$$

$$f_{wncc}(P) = \frac{\operatorname{cov}_w(I_t(x), I_R(W(x, P)))}{\sqrt{\operatorname{var}_w(I_t(x)) \operatorname{var}_w(I_R(W(x, P)))}},$$

where $$\operatorname{cov}_w(I_t(x), I_R(W(x,P))) = E_w[I_t(x)I_R(W(x,P))] - E_w[I_t(x)] E_w[I_R(W(x,P))]$$

is the weighted covariance between $I_t(x)$ and $I_R(W(x,P))$, $$\operatorname{var}_w(I_t(x)) = E_w[I_t(x)^2] - (E_w[I_t(x)])^2$$

$$\text{and } \operatorname{var}_w(I_R(W(x,P))) = E_w[I_R(W(x,P))^2] - (E_w[I_R(W(x,P))])^2$$

are the weighted variances of $I_t(x)$ and $I_R(W(x,P))$, respectively, with $$E_w[I_t(x) I_R(W((x, P))] = \frac{1}{K} \sum_x \kappa_t(x) \kappa_R(W(x, P)) I_t(x) I_R(W(x, P)),$$

$$E_w[I_t(x)] = \frac{\sum_x \kappa_t(x) I_t(x)}{\sum_x \kappa_t(x)},$$

$$E_w[I_R(W(x, P))] = \frac{\sum_x \kappa_R(W(x, P)) I_R(W(x, P))}{\sum_x \kappa_R(W(x, P))},$$

$$\text{and } K = \sum_k \kappa(x) \kappa(W(x, P)).$$

Global Optimization Through Kernel-Based Nonparametric Data Analysis

Figure 4:
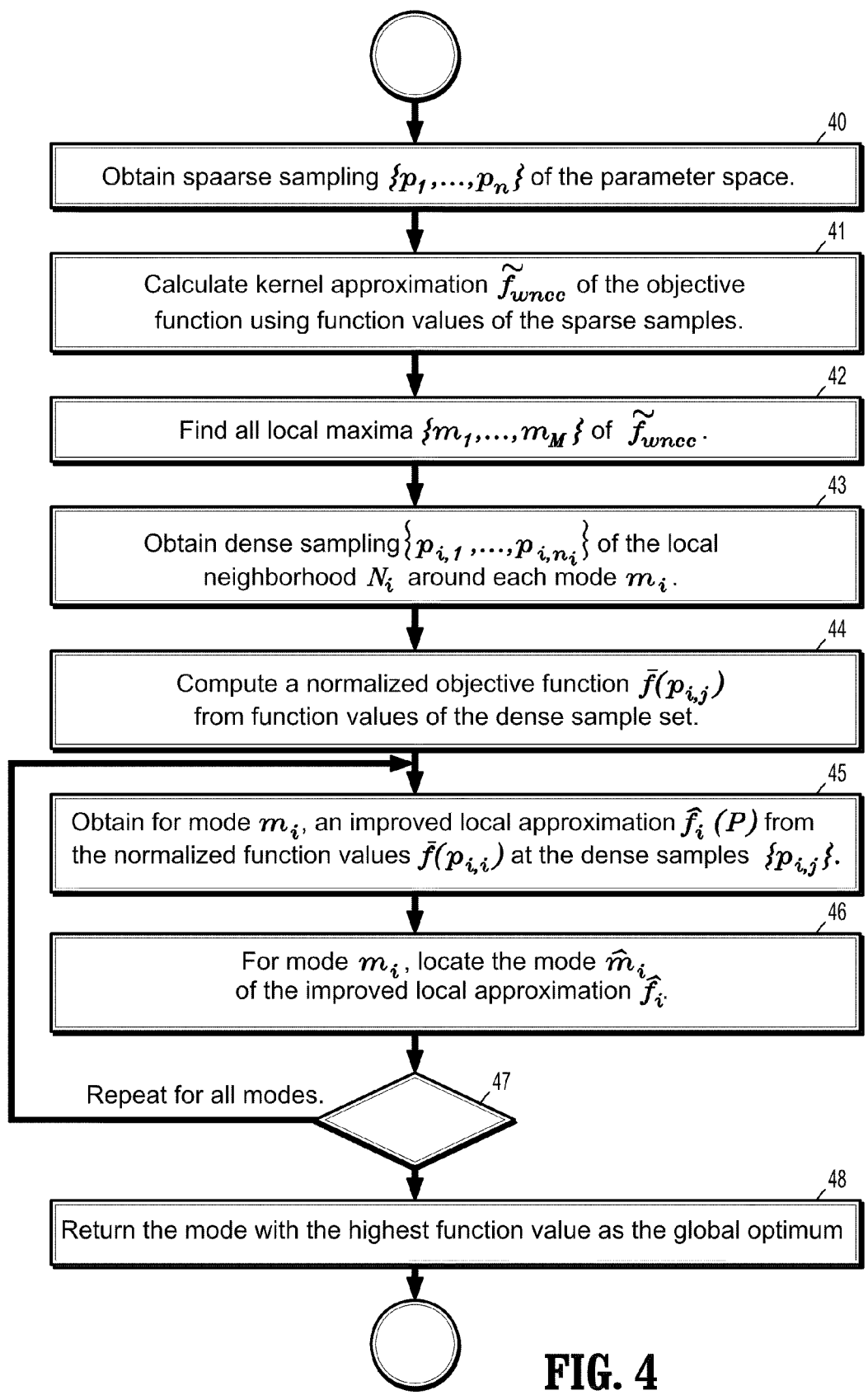
FIG. 4 is a flow chart of a nonparametric data analysis method of optimizing the objective function and finding the global optimum among multiple local optima, according to an embodiment of the invention.

A nonparametric data analysis technique may be used to characterize the objective function $f_{wncc}$ in the parameter space and identify the global optimum among multiple local optima. Nonparametric data analysis is widely used in data mining and computer vision to effectively analyze complex data distributions with multiple modes. A flow chart of how this technique may be applied to optimization is presented in FIG. 4. Referring now to the figure, in a first phase, sparse sampling is performed in the parameter space step 40 and an approximation of the objective function $f_{wncc}$ is obtained at step 41 using a kernel approximation. Assume that $\{p_1, \ldots, p_n\}$ are a set of sparse samples in the parameter space with function values $\{f_{wncc}(p_1), \ldots, f_{wncc}(p_n)\}$. An exemplary, non-limiting set of sparse samples are 8 pixels apart in both the x and y directions. An approximation of $f_{wncc}$ may be obtained using a kernel density approximation technique:

$$\tilde{f}_{wncc}(P) = \sum_{i=1}^n w_i K(P, p_i, \sigma_s^2) \; (w_i > 0) \quad (15)$$

A choice for $K(\ )$ according to an embodiment of the invention is a Gaussian kernel $$K(P, p_i, \sigma_s^2) = \frac{\exp(-\|P - p_i\|^2 / (2\sigma_s^2))}{(2\pi \sigma_s^2)^{\dim(P)/2}}$$

defined by its center $p_i$ and bandwidth $\sigma_s$. The non-negative weights $w_i$ are determined by minimizing the sum of squared differences between $\{f_{wncc}(p_i)\}$ and $\{\tilde{f}_{wncc}(p_i)\}$. This leads to a non-negative least squares task for which efficient solvers are known. Essentially, $\tilde{f}_{wncc}$ is a smoothed version of $f_{wncc}$. According to an embodiment of the invention, the mean shift algorithm may be applied at step 42 to find all the modes, i.e., local maxima of $\tilde{f}_{wncc}$, which are denoted as $\{m_1, \ldots, m_M\}$.

In a second phase, dense sampling is performed in the local neighborhood $N_i$ around each mode $m_i$, at step 43, yielding the dense sample set $\{p_{i,1}, \ldots, p_{i,n_i}\}$ with function values $\{f_{wncc}(p_{i,1}), \ldots, f_{wncc}(p_{i,n_i})\}$. An exemplary, non-limiting set of dense samples are 2 pixels apart in both the x and y directions. A normalized objective function is computed from the function values over the dense sample set at step 44:

$$\tilde{f}(p_{i,j}) = \max\{0, f_{wncc}(p_{i,j}) - f_{m,i} + 0.1\} \quad (16)$$

where $f_{m,i} = \max\{f_{wncc}(p_{i,j}): j=1, \ldots, n_i\}$. At step 45, for each mode $m_i$, an improved local approximation according to an embodiment of the invention $\hat{f}_i(P) \in N_i$ may be obtained from the normalized function values $\{\tilde{f}(p_{i,j})\}$ at the dense samples $\{p_{i,j}\}$ through a kernel approximation:

$$\hat{f}_i(P) = \sum_j \hat{w}_j K(P, p_{i,j}, \sigma_d^2), \quad (17)$$

where the weights $\hat{w}_j$ are calculated as for EQ. (15) using the normalized function values. According to an embodiment of the invention, the mean shift algorithm may be used at step 46 to locate the mode $\hat{m}_i$ of the improved local approximation $\hat{f}_i$. Finally, at step 47, the mode with the highest function value is returned as the global optimum, $m_{opt} = m_{i^*}$, where $i^* = \operatorname{argmax} f_{wncc}(\hat{m}_i)$. The normalization of $\{\tilde{f}(p_{i,j})\}$ is used to make a confidence measure proposed in the next subsection comparable. In addition, by suppressing the function value for P away from the local mode, the kernel approximation is able to focus on a close neighborhood of the local mode.

In experiments, global optimization was performed in the translational space, i.e., $P=[t_x, t_y]$ as translational motion is the dominant component of breathing motion observed in coronary fluoroscopy. However, a global optimization algorithm according to an embodiment of the invention applies to other parametric motion models as well.

Uncertainty Analysis and Self Assessment

Figure 5A:
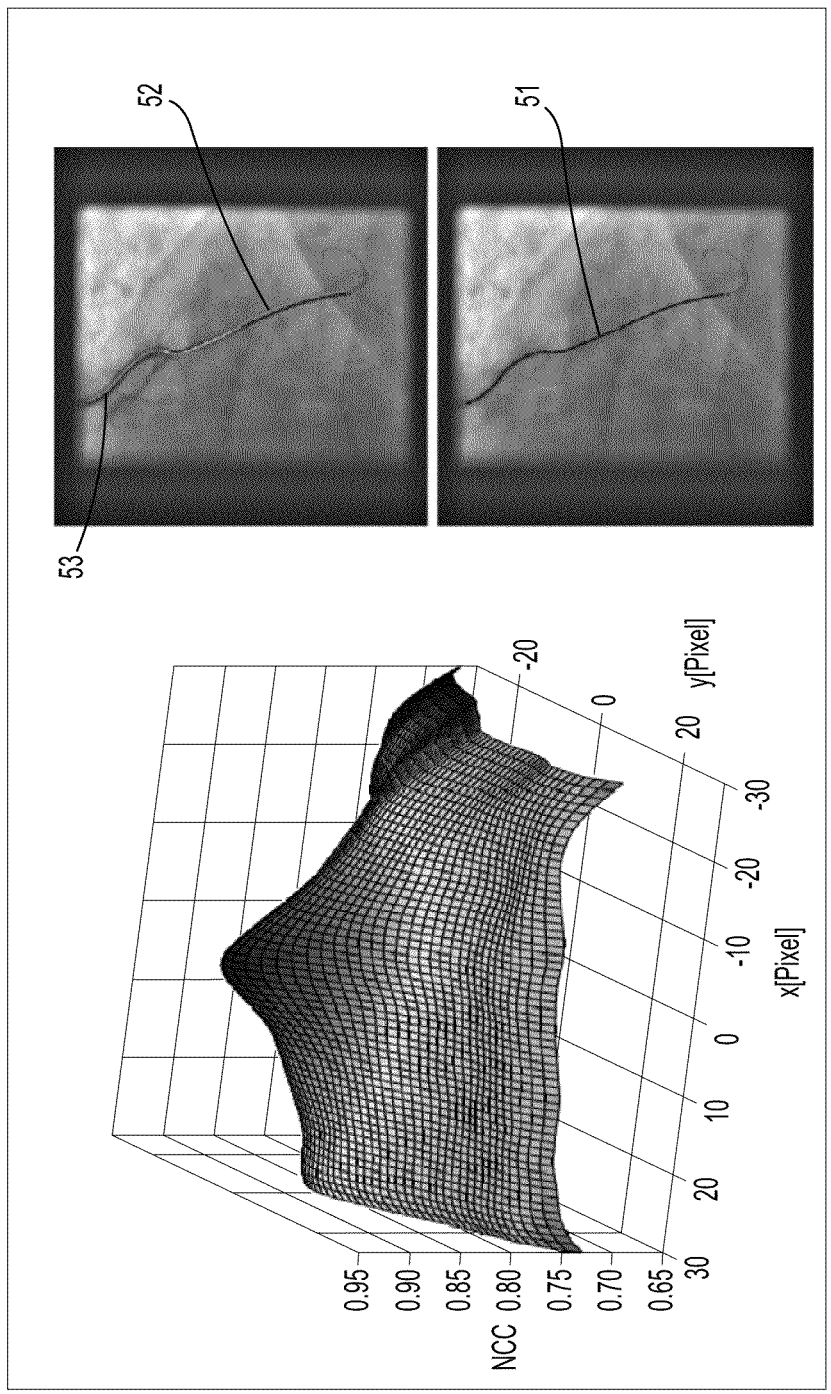
FIGS. 5(a)-(b) depicts surfaces of different objective functions.
Figure 5B:
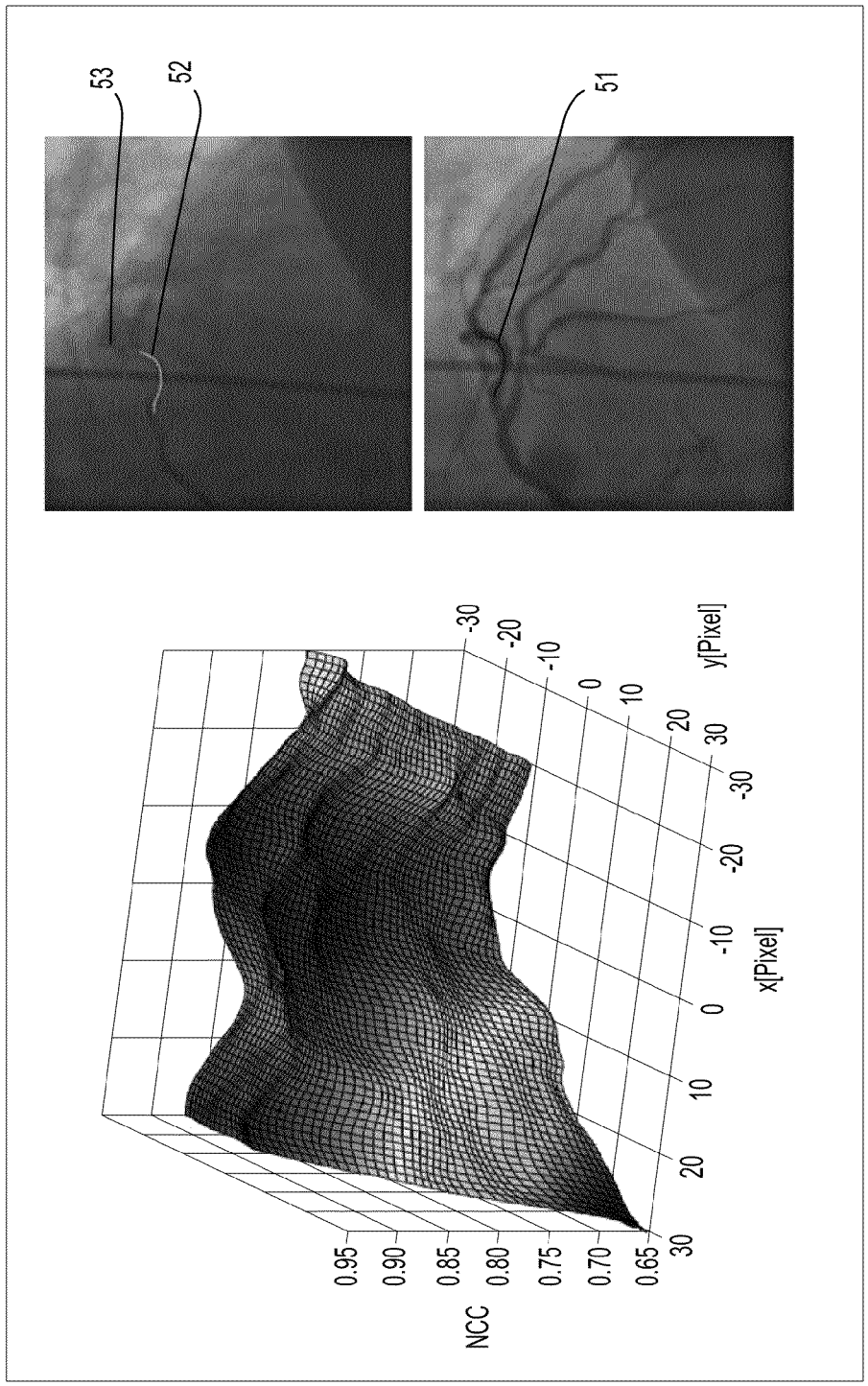

By exploring information about the shape of the objective function, one can further assess the uncertainty associated with the motion estimation. FIGS. 5(a)-(b) illustrate surfaces of different objective functions. Surfaces of $f_{wncc}$ with a single dominant mode as shown on the left side of FIG. 5(a) indicate less ambiguity in the image data and more reliable matches. In contrast, flat surfaces or surfaces with multiple modes as shown on the left side of FIG. 5(b) indicate large ambiguity in the image data and large uncertainty associated with motion estimates.

To quantify the uncertainty of motion estimation, a Gaussian distribution may be fit to the surface of the objective function $\hat{f}_i(P)$ in the local neighborhood $N(\hat{m}_i)$ of a mode $\hat{m}_i$:

$$\hat{f}(P)|_{P \in N(\hat{m}_i)} \approx K(P, \hat{m}_i, \hat{C}_i) = \frac{\exp\left(-\frac{1}{2}(P - \hat{m}_i)^T C_i^{-1} (P - \hat{m}_i)\right)}{(2\pi)^{\dim(P)/2} |C_i|^{1/2}}. \quad (18)$$

Figure 6B:
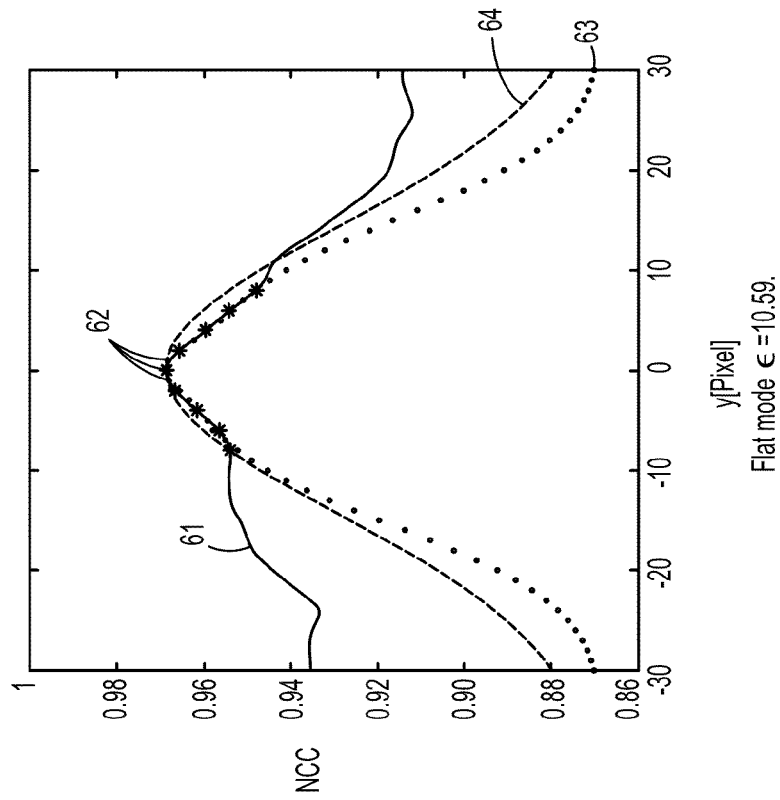
FIGS. 6(a)-(b) illustrates the fitting of a Gaussian distribution to the objective function
Figure 6A:
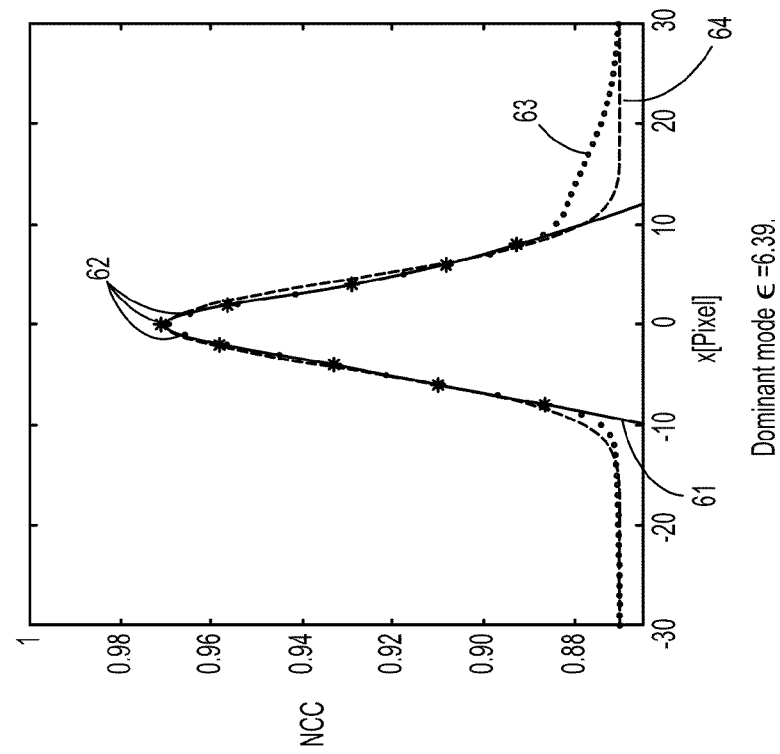

The covariance matrix $\hat{C}_i$ can be calculated in an embodiment of the invention by minimizing the difference between two surface gradients:

$$\hat{C}_i = \arg\min_{(C \in S)} \Sigma \|\nabla K(P_i p_{i,j}, C) - \nabla \hat{f}_i(p_{i,j})\|^2, \quad (19)$$

where S denotes the set of positive definite matrices. FIGS. 6(a)-(b) are plots of examples of fitting a local Gaussian to the objective function around a mode. FIG. 6(a) has a dominant mode, while FIG. 6(b) has a flat mode. In the figures, curve 61 represents the objective function, points 62 are the objective function samples, curve 63 represents the multikernel approximation, and curve 64 represents the single kernel approximation. For clarity, not all of the points 62 are explicitly indicated.

A measure for quantifying the uncertainty of random variables is entropy. The differential entropy of a Gaussian distributed random variable with covariance matrix C may be defined as:

$$h(C) = \ln(2\pi e) + 0.5 \ln(|C|). \quad (20)$$

By omitting the constant terms, and the uncertainty of the objective function around mode $\hat{m}_i$ may be defined as:

$$\in_i = \ln(|\hat{C}_i|). \quad (21)$$

To determine the uncertainty of the complete surface, the uncertainty measures for multiple modes may be combined through a weighted sum. Modes with higher function values $f_{wncc}$ are weighted higher and minor modes with lower function values are ignored. An entropy based uncertainty measure according to an embodiment of the invention summed over multiple modes may be defined as $$Y = \sum_{i=1}^{M} w_i \varepsilon_i, \quad (22)$$

$$w_i = \max\{0, 1 - (f_{wncc}(\hat{m}_i) - f_m)/s_{th}\},$$

$$f_m = \max\{f_{wncc}(\hat{m}_i) : i = 1, \ldots, M\},$$

where $s_{th}$ is a threshold. Y may be used for the self-assessment of an optimization algorithm according to an embodiment of the invention. A motion estimate is accepted when its uncertainty measure is below a threshold $Y_{th}$, and the objective function value is above a threshold $f_{th}$. Otherwise, the motion estimate is rejected.

Results

Figure 7A:
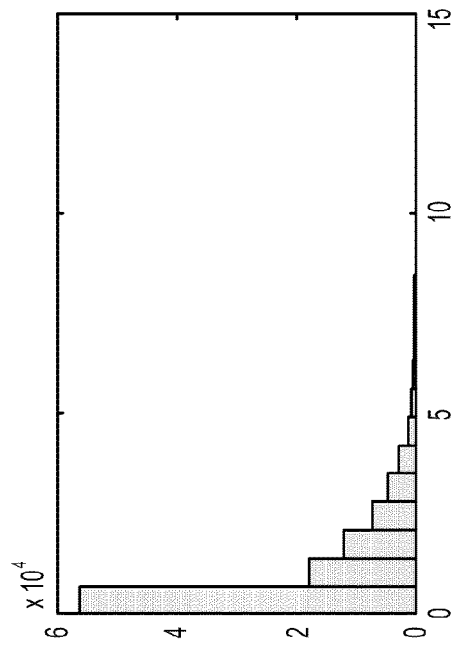
FIGS. 7(a)-(b) depicts the distribution of the misalignment error according to an embodiment of the invention
Figure 7B:
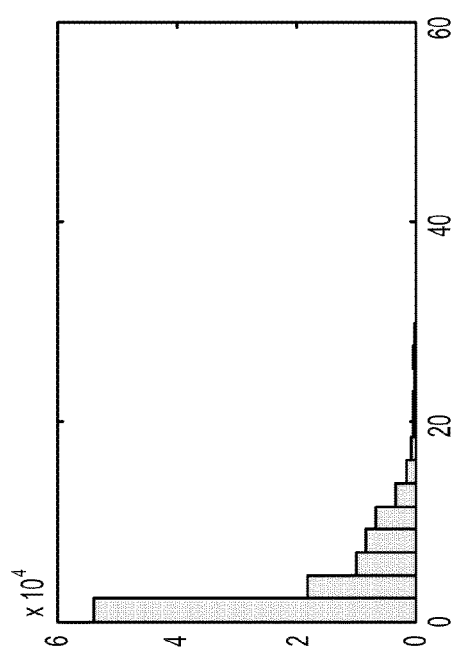

To test the accuracy of a motion compensation method according to an embodiment of the invention, fluoroscopic images from 7 clinical cases of chronic total occlusion or stenosis treatment were used. The data was acquired on an Angiographic C-arm system from different angles. Each image frame has 512×512 pixels and the pixel size is either 0.216 mm or 0.308 mm. These cases were chosen because they all had guidewires present throughout the entire image sequences, which provided the ground truth of vessel centerlines for evaluation. Images with contrast injection or visible guidewires were used as the reference images for the initial roadmap overlay. In each reference image, the centerline or the guidewire of one coronary artery was manually labeled to simulate the initial roadmap overlay. Motion compensation was performed on a total of 106 frames, and used the estimated motion parameters to transform the initial roadmaps to match the test images. In each test image, the guidewire was manually labeled and used as the ground truth for the coronary centerline. The ground truth of the coronary centerlines was compared with the motion compensated roadmap overlays. As a misalignment measure, the distances between the motion compensated roadmap and the image pixels on the ground truth labels were calculated. FIGS. 7(a)-(b) depict the distribution of the misalignment error. FIG. 7(a) illustrates the error in pixels, and FIG. 7(b) illustrates the error in millimeters. The mean, median and standard deviation of the misalignment are 4.1064, 2.2361 and 4.9317 pixels, or 1.1443 mm, 0.6469 mm and 1.3801 mm respectively.

Figure 8:
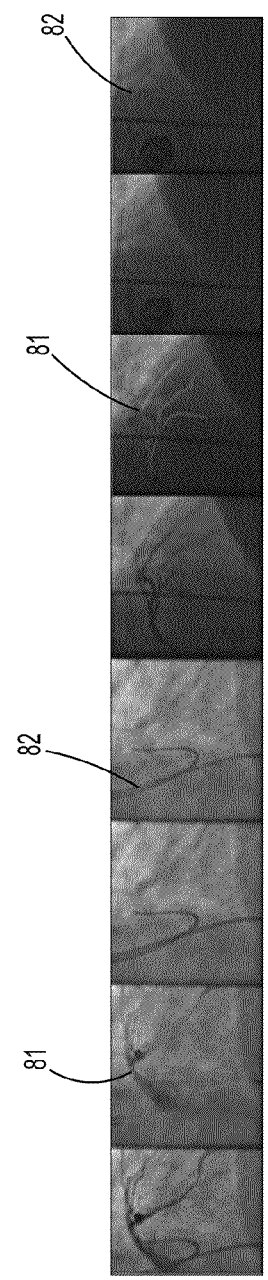
FIG. 8 shows examples of motion compensated roadmap overlays, according to an embodiment of the invention.

FIG. 8 depicts coronary roadmapping in pairs of an original reference image and a test image with a roadmap overlay, showing roadmaps 81 in reference images, and motion compensated roadmaps 82 in test images.

Fluoroscopic data from 16 CTO cases was used to evaluate the global optimization algorithm and the self-assessment technique. The data was acquired by an Angiographic C-arm system, with pixel size ranging from 0.184 mm to 0.216 mm. These cases were chosen because they had either visible vessel structures or guidewires present, which provided the ground truth of the vessel centerline for evaluation. Visible vessel structures as well as guidewires in the fluoroscopy data were annotated as splines to represent vessel centerlines.

As FIGS. 5(a)-(b) shows, for every test case, multiple images associated with the same cardiac phase were annotated. One of the images was selected as the reference image (lower right images in FIG. 5), and its annotated spline 51 simulated the initial roadmap overlay. The rest of the images were used for testing (upper right images in FIG. 5) with the corresponding vessel structures 52 annotated as ground truth for evaluation. A motion estimation was performed between the reference image and each testing image, and the estimated motion was used to transform the annotated spline in the reference image to match the testing image, which simulated the motion compensated overlay 53. To quantify the motion estimation error, the distances between the motion compensated overlays 53 and the ground truth structures 52 was calculated. The point to spline distances were calculated between each pair of splines, and the median of all distances was chosen as the error distance.

Global optimization was performed on fluoroscopy images at a reduced resolution. Sparse sampling in the translational space was performed in the range of ±32 pixels with a sampling distance $\Delta t_x = \Delta t_y = 8$ pixels for the smooth approximation $\tilde{f}_{wncc}$ and in the range of ±8 pixels with a distance $\Delta t_x = \Delta t_y = 2$ pixels for the improved approximations $\{\hat{f}_i\}$. The bandwidth of the Gaussian kernels was set to $\sigma_s^2 = 64$ for $\tilde{f}_{wncc}$ and $\sigma_d^2 = 4$ for $\{\hat{f}_i\}$. $Y_{th} = 14$, $f_{th} = 0.8$, and $s_{th} = 0.05$ were used to perform self assessment on motion estimates.

Figure 10:
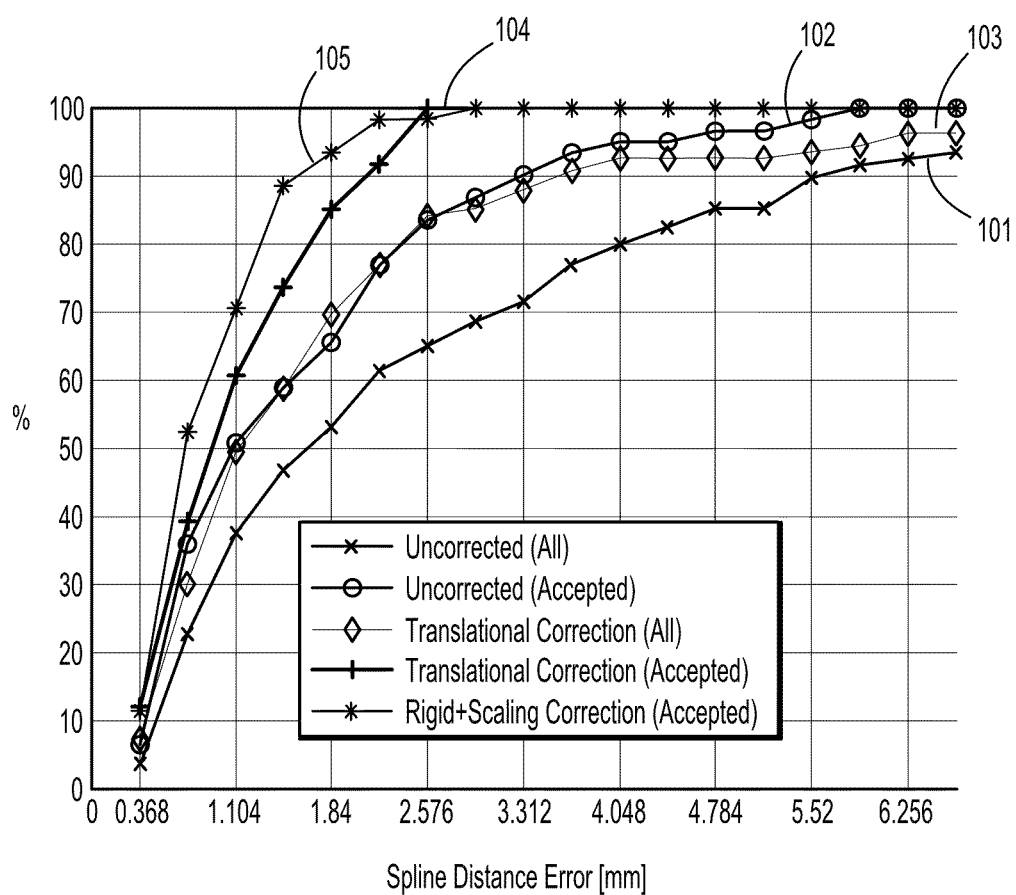
FIG. 10 is a graph of the cumulative distribution of the motion compensation error.

To further improve the results, a rigid+scaling (R+S) motion model was used, extending the translational model by a rotation and two scaling parameters in the x and y direction. To find the optimal parameters, a gradient descent based optimization strategy was used, initialized with accepted results of the global optimization. The table in FIG. 9 shows, for each of the 16 test sequences, the number of test matches, the number of accepted matches and the mean of the error distance from the globally optimized translational model, the R+S model and without any motion correction. Without motion correction, the mean error over all motion estimates is 2.474 mm. With a translational motion model, the mean error reduces to 1.796 mm without self-assessment, and to 1.121 mm with self-assessment. With a R+S motion model and self assessment, the error reduces to 0.948 mm By performing self assessment, 59% of the motion estimates are accepted. FIG. 10 shows plots of a few cumulative distributions describing the percentage of tests with an estimation error equal or below the values on the x axis under different motion models. Referring to the figure, curve 101 represents the cumulative distribution for all uncorrected motion estimates, curve 102 represents the cumulative distribution for the accepted uncorrected motion estimates, curve 103 represents the cumulative distribution for all estimates with translation correction, curve 104 represents the cumulative distribution for the accepted motion estimates with translation correction, and curve 105 represents the cumulative distribution for the accepted motion estimates with rigid motion and scaling corrections. Without motion compensation, ~53% of the motion estimates have an error of 1.84 mm or below. With translational motion compensation, ~70% of all motion estimates and ~85% of the accepted motion estimates have an error of 1.84 mm or below. Under the R+S motion model, this percentage increases to 93%

The experiments showed that in these cases the shape of the objective function tended to be flat or have multiple modes. Exploring information about the shape of the objective function helps to identify unreliable motion estimates. The evaluation of the global optimization algorithm and the self-assessment method showed that all cases with an incorrect motion estimation were detected and almost all accepted motion estimates had an error below 2.6 mm compared to the annotated ground truth motion. However, the acceptance rate in some cases is very low.

System Implementations

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 11:
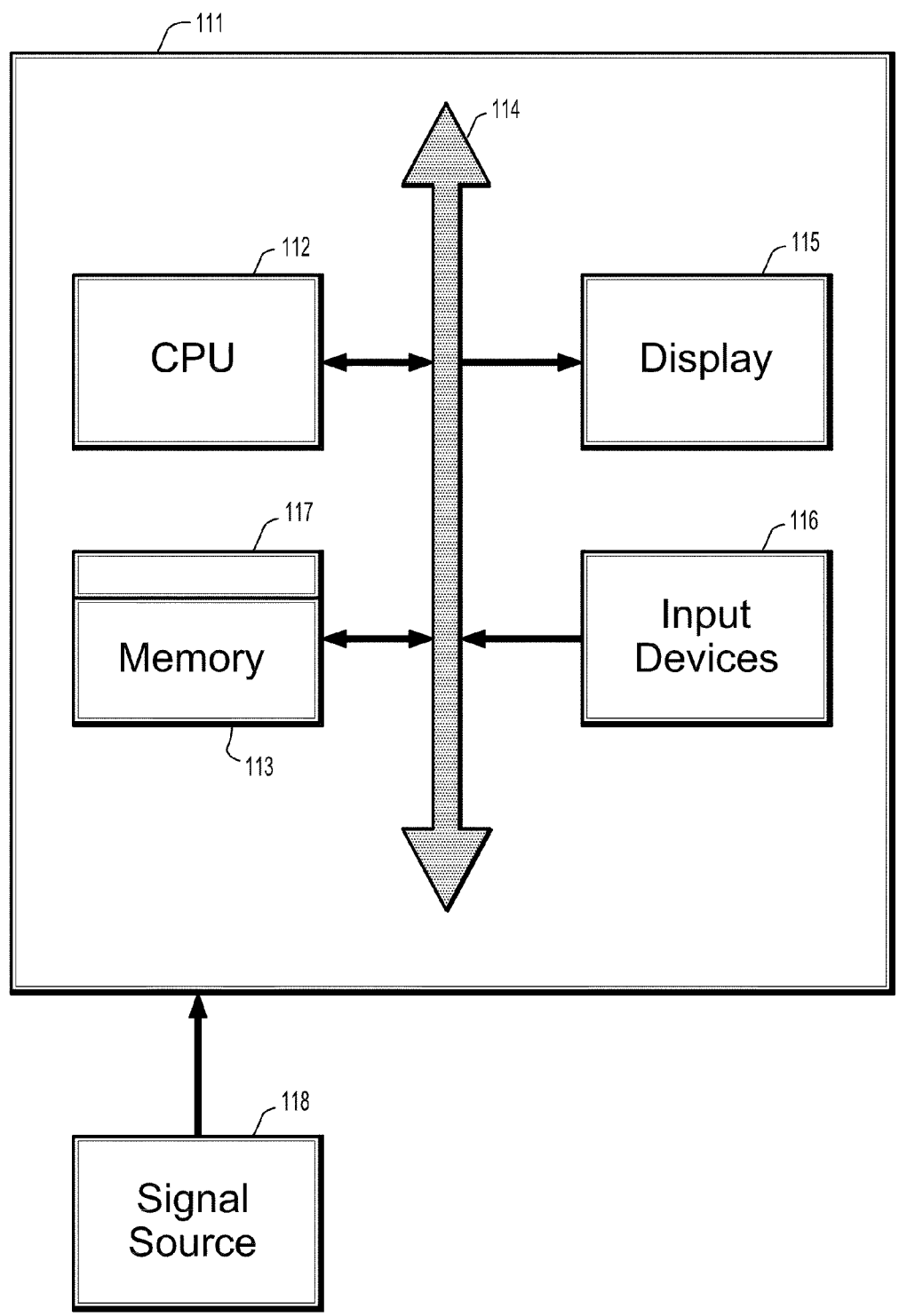
FIG. 11 is a block diagram of an exemplary computer system for implementing a method for motion compensation of respiratory motion in live X-ray fluoroscopic images, according to an embodiment of the invention.

FIG. 11 is a block diagram of an exemplary computer system for implementing a method for motion compensation of respiratory motion in live X-ray fluoroscopic images, according to an embodiment of the invention. Referring now to FIG. 11, a computer system 111 for implementing the present invention can comprise, inter alia, a central processing unit (CPU) 112, a memory 113 and an input/output (I/O) interface 114. The computer system 111 is generally coupled through the I/O interface 114 to a display 115 and various input devices 116 such as a mouse and a keyboard. The support circuits can include circuits such as cache, power supplies, clock circuits, and a communication bus. The memory 113 can include random access memory (RAM), read only memory (ROM), disk drive, tape drive, etc., or a combinations thereof. The present invention can be implemented as a routine 117 that is stored in memory 113 and executed by the CPU 112 to process the signal from the signal source 118. As such, the computer system 111 is a general purpose computer system that becomes a specific purpose computer system when executing the routine 117 of the present invention.

The computer system 111 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While embodiments of the present invention has been described in detail with reference to exemplary embodiments, those skilled in the art will appreciate that various modifications and substitutions can be made thereto without departing from the spirit and scope of the invention as set forth in the appended claims.

What is claimed is:

1. A method for compensating respiratory motion in coronary fluoroscopic images, the method comprising the steps of:
    finding a set of transformation parameters of a parametric motion model that minimize a weighted sum of square distances between a reference image acquired at a first time that is warped by the parametric motion model and a first incoming image acquired at a second time subsequent to the first time,
    wherein said weights are calculated as a ratio of a covariance of gradients of the reference image and gradients of the first incoming image with respect to a root of a product of a variance of the gradients of the reference image and the variance of the gradients of the first incoming image, and
    wherein the parametric motion model transforms the reference image to match the first incoming image.

2. The method of claim 1, wherein minimizing the weighted sum of square distances comprises the steps of:
    initializing a parametric motion model of soft tissue in a reference image acquired at a first time and in an incoming image acquired at a second time;
    using the parametric motion model to warp the reference image and a local correlation coefficient of the gradient fields between the reference and the incoming images;
    computing a residual image that is a difference between the incoming image and the warped reference image;
    using the parametric motion model to warp the gradient of the reference image;
    computing a Jacobian matrix of the parametric motion model and a Hessian matrix using said Jacobian matrix, the warped reference image gradients, and the warped and unwarped local correlation coefficients; and
    calculating an update to the parameters of the parametric motion model from the Hessian matrix, the Jacobian matrix, the warped reference image gradients, the warped and unwarped local correlation coefficients, and the residual image.

3. The method of claim 1, wherein the reference image comprises a fluoroscopic image acquired when a contrast agent is injected, and the first incoming image is a fluoroscopic image acquired after the contrast medium has disappeared.

4. The method of claim 1, further comprising calculating the parametric motion model between the reference image and a second incoming image acquired at a third time subsequent to the second time by compositional motion model $W(x,P_{2,0}) = W(W(x,P_{2,1}),P_{1,0})$, wherein $W(x,P)$ represents the parametric motion model as a function of image points x and parameters P, $W(x,P_{2,1})$ represents the parametric motion model between the first incoming image and the second incoming image, $W(x,P_{1,0})$ represents the parametric motion model between the reference image and the first incoming image, and W(x,P$_{2,0}$) represents the parametric motion model between the reference image and the second incoming image.

5. The method of claim 2, wherein the weighted sum of square distances is represented as $$P = \operatorname{argmin} \frac{1}{K} \sum_{x \in \Omega_P^1} \kappa(x)\kappa(W(x, P))\|I_t(x) - I_R(W(x, P))^2\|,$$

$$\kappa(x) = \frac{1}{2}(1 - \rho(x)); \quad K = \sum_{x \in \Omega_P^1} \kappa(x)\kappa(W(x, P)),$$

wherein $I_t(x)$ represents the first incoming image, $I_R(x)$ represents the reference image, W(x,P) represents the parametric motion model as a function of image points x and parameters P, $\Omega_P^{-1} = W^{-1}(\Omega, P)$, $\Omega$ denotes the image region of the heart exclusive of the coronary arteries due to contrast disappearance, $$\rho(x) = \frac{\operatorname{cov}(|\nabla I_t(x')|, |\nabla I_R(x')|)}{\sqrt{\operatorname{var}(|\nabla I_t(x')|)\operatorname{var}(|\nabla I_R(x')|)}} \bigg| x' \in N(x),$$

and wherein $\operatorname{cov}(|\nabla I_t|, |\nabla I_R|)$ and $\operatorname{var}(|\Delta I_{t/R}|)$ are the covariance and variance terms of the gradients of $I_t$ and $I_R$ computed in a local neighborhood N(x).

6. The method of claim 5, wherein the Hessian matrix $\tilde{H}$ is computed from $$\tilde{H} = \sum_{x \in \Omega_P^1} \kappa(x)\kappa(W(x, P))\left(\frac{\partial W}{\partial P}\nabla I_R\right)\left(\frac{\partial W}{\partial P}\nabla I_R\right)^T,$$

wherein $$\frac{\partial W}{\partial P}$$

is the Jacobian matrix of the parametric motion model W with respect to the parameters P.

7. The method of claim 5, wherein the update $\Delta P$ to the parameters of the parametric motion model are calculated from $$\Delta P = \tilde{H}^{-1} \sum_{x \in \Omega_P^1} \nabla I_R^T \left(\frac{\partial W}{\partial P}\right)^T \kappa(x)\kappa(W(x, P))(I_t(x) - I_R(W(x, P))),$$

and the parameters are updated as $P \leftarrow P + \Delta P$.

8. A method for compensating respiratory motion in coronary fluoroscopic images, the method comprising the steps of:
finding a set of transformation parameters of a parametric motion model that maximize an objective function that is a weighted normalized cross correlation function of a reference image acquired at a first time that is warped by the parametric motion model and a first incoming image acquired at a second time subsequent to the first time, wherein said weights are calculated as a ratio of a covariance of gradients of the reference image and gradients of the first incoming image with respect to a root of a product of a variance of the gradients of the reference image and the variance of the gradients of the first incoming image, and wherein the parametric motion model transforms the reference image to match the first incoming image.

9. The method of claim 8, wherein finding a set of transformation parameters that maximize said objective function comprises:
performing a sparse sampling in a space of the transformation parameters of the parametric motion model;
to calculating an approximation to the objective function from a weighted sum over kernel density functions centered at the sparse samples, wherein the weights are non-negative values calculated by minimizing a sum of square differences of objective function values of the sparse samples and the approximate objective function values of the sparse samples;
finding the local maxima of the approximate objective function;
performing a dense sampling in a local neighborhood about each local maximum;
normalizing objective function values of the dense samples;
calculating an improved approximate objective function for each local maximum from the normalized function values of the dense samples;
finding an improved local maximum of the improved approximate objective function for each local maximum; and
selecting an improved local maximum with a highest function value as a global optimum.

10. The method of claim 9, wherein the kernel density function is a Gaussian function $$K(P, p_i, \sigma_s^2) = \frac{\exp(-\|P - p_i\|^2/(2\sigma_s^2))}{(2\pi\sigma_s^2)^{\dim(P)/2}}$$

where P a parameter of the parametric motion model, $p_i$, is a sampled parameter value, and $\sigma_s^2$ is a standard deviation.

11. The method of claim 9, wherein a mean shift method if used to calculate the local maxima of the approximate objective function, and the improved local maximum of the improved approximate objective function.

12. The method of claim 9, wherein normalizing objective function values of the dense samples comprises calculating $$\tilde{f}(p_{i,j}) = \max\{0, f_{wncc}(p_{i,j}) - f_{m,i} + 0.1\},$$

wherein $p_{i,j}$ is a jth dense sample in the local neighborhood of an ith local maximum, $f_{wncc}$ is the objective function, $f_{m,i} = \max\{f_{wncc}(p_{i,j}): j=1, \ldots, n_i\}$, and $n_i$ is the number of samples.

13. The method of claim 10, wherein calculating an improved approximate objective function $\hat{f}_i(P)$ for each local maximum i comprises calculating $$\hat{f}_i(P) = \sum_j \hat{w}_j K(P, p_{i,j}, \sigma_d^2),$$

wherein the sum is over all samples about the local maximum, and the weights $\hat{w}_j$ are calculated using normalized function values at the dense samples.

14. The method of claim 13, further comprising calculating an uncertainty $\in_i$ of the objective function about each local maximum i from $\in_i = \ln(|\hat{C}_i|)$, herein $\hat{C}_i$ is a covariance calculated as $$\hat{C}_i = \mathrm{argmin}_{(C \in S)} \sum_j \left\| \nabla K(P, p_{i,j}, C) - \nabla \hat{f}_i(p_{i,j}) \right\|^2,$$

wherein S denotes the set of positive definite matrices, $\nabla \hat{f}_i$ is a gradient of the improved approximate objective function, and K is a Gaussian defined as $$K(P, p_{i,j}, \hat{C}_i) = \frac{\exp\left(-\frac{1}{2}(P - p_{i,j})^T C_i^{-1}(P - p_{i,j})\right)}{(2\pi)^{dim(P)/2} |C_i|^{1/2}}.$$

15. The method of claim 14, further comprising calculating an uncertainty of the objective function as $$Y = \sum_{i=1}^{M} w_i \varepsilon_i,$$

wherein $w_i = \max\{0, 1 - (f_{wncc}(m_i) - f_m)/s_{th}\}$, $f_m = \max\{f_{wncc}(\hat{m}_i) : i = 1, \ldots, M\}$, $\hat{m}_i$ is an ith local maximum, and $s_{th}$ is a threshold, and wherein a motion estimate is accepted when its uncertainty measure Y is below a threshold $Y_{th}$, and the objective function value is above a threshold $f_{th}$.

16. A program storage device readable by a computer, tangibly embodying a program of instructions executable by the computer to perform the method steps for compensating respiratory motion in coronary fluoroscopic images, the method comprising the steps of:
  finding a set of transformation parameters of a parametric motion model that maximize an objective function that is a weighted normalized cross correlation function of a reference image acquired at a first time that is warped by the parametric motion model and a first incoming image acquired at a second time subsequent to the first time, wherein said weights are calculated as a ratio of a covariance of gradients of the reference image and gradients of the first incoming image with respect to a root of a product of a variance of the gradients of the reference image and the variance of the gradients of the first incoming image, and
  wherein the parametric motion model transforms the reference image to match the first incoming image.

17. The computer readable program storage device of claim 16, wherein finding a set of transformation parameters that maximize said objective function comprises:
  performing a sparse sampling in a space of the transformation parameters of the parametric motion model;
  calculating an approximation to the objective function from a weighted sum over kernel density functions centered at the sparse samples, wherein the weights are non-negative values calculated by minimizing a sum of square differences of objective function values of the sparse samples and the approximate objective function values of the sparse samples;
  finding the local maxima of the approximate objective function;
  performing a dense sampling in a local neighborhood about each local maximum;
  normalizing objective function values of the dense samples;
  calculating an improved approximate objective function for each local maximum from the normalized function values of the dense samples;
  finding an improved local maximum of the improved approximate objective function for each local maximum; and
  selecting an improved local maximum with a highest function value as a global optimum.

18. The computer readable program storage device of claim 17, wherein the kernel density function is a Gaussian function $$K(P, p_i, \sigma_s^2) = \frac{\exp(-\|P - p_i\|^2 / (2\sigma_s^2))}{(2\pi \sigma_s^2)^{dim(P)/2}}$$

where P a parameter of the parametric motion model, $p_i$ is a sampled parameter value, and $\sigma_s^2$ is a standard deviation.

19. The computer readable program storage device of claim 17, wherein a mean shift method if used to calculate the local maxima of the approximate objective function, and the improved local maximum of the improved approximate objective function.

20. The computer readable program storage device of claim 17, wherein normalizing objective function values of the dense samples comprises calculating $$\bar{f}(p_{i,j}) = \max\{0, f_{wncc}(p_{i,j}) - f_{m,i} + 0.1\},$$

wherein $p_{i,j}$ is a jth dense sample in the local neighborhood of an ith local maximum, $f_{wncc}$ is the objective function, $f_{m,i} = \max\{f_{wncc}(p_{i,j}) : j = 1, \ldots, n_i\}$, and $n_i$ is the number of samples.

21. The computer readable program storage device of claim 18, wherein calculating an improved approximate objective function $\hat{f}_i(P)$ for each local maximum i comprises calculating $$\hat{f}_i(P) = \sum_j \hat{w}_j K(P, p_{i,j}, \sigma_d^2),$$

wherein the sum is over all samples about the local maximum, and the weights $\hat{w}_j$ are calculated using normalized it) function values at the dense samples.

22. The computer readable program storage device of claim 21, further comprising calculating an uncertainty $\in_i$ of the objective function about each local maximum i from $\in_i = \ln(|\hat{C}_i|)$, wherein $\hat{C}_i$ is a covariance calculated as $$\hat{C}_i = \mathrm{argmin}_{(C \in S)} \sum_j \left\| \nabla K(P, p_{i,j}, C) - \nabla \hat{f}_i(p_{i,j}) \right\|^2,$$

wherein S denotes the set of positive definite matrices, $\nabla \hat{f}_i$ is a gradient of the improved approximate objective function, and K is a Gaussian defined as $$K(P, p_{i,j}, \hat{C}_i) = \frac{\exp\left(-\frac{1}{2}(P - p_{i,j})^T C_i^{-1}(P - p_{i,j})\right)}{(2\pi)^{dim(P)/2}|C_i|^{1/2}}.$$

23. The computer readable program storage device of claim 22, further comprising calculating an uncertainty of the objective function as $$Y = \sum_{i=1}^{M} w_i \varepsilon_i,$$

wherein $w_i = \max\{0, 1 - (f_{wncc}(m_i) - f_m)/s_{th}\}$, $f_m = \max\{f_{wncc}(\hat{m}_i) : i = 1, \ldots, M\}$, $\hat{m}_i$ an ith local maximum, and $s_{th}$ is a threshold, and wherein a motion estimate is accepted when its uncertainty measure Y is below a threshold $Y_{th}$, and the objective function value is above a threshold $f_{th}$.

* * * * *